Dec. 1, 1953    A. W. ZMUDA ET AL    2,660,990
VALVE ROTATING DEVICE

Filed March 31, 1950    2 Sheets-Sheet 1

Inventors
Andrew W. Zmuda &
Thomas H. Mitzelfeld
By
Willits, Helwig & Baillio
Attorneys

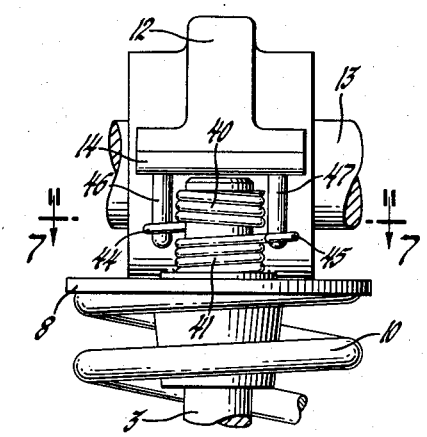
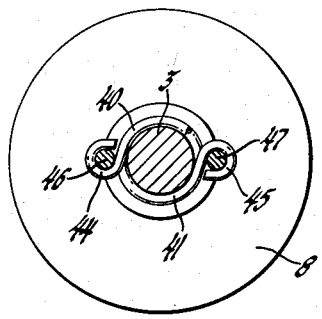
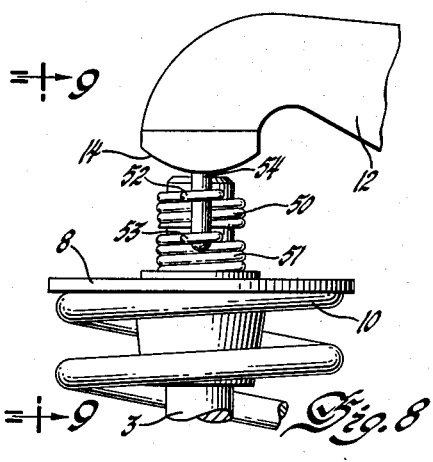
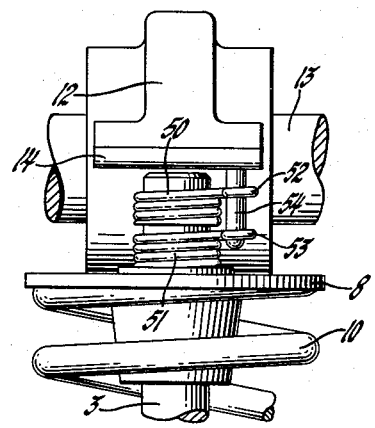
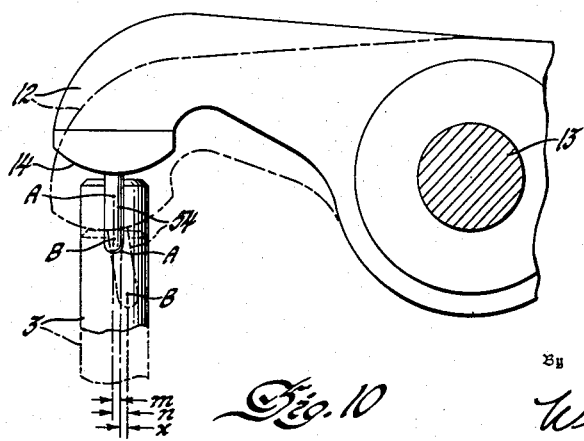

Patented Dec. 1, 1953

2,660,990

UNITED STATES PATENT OFFICE 2,660,990

VALVE ROTATING DEVICE

Andrew W. Zmuda and Thomas H. Mitzelfeld, Detroit, Mich., assignors to General Motors Corporation, Detroit, Mich., a corporation of Delaware Application March 31, 1950, Serial No. 153,074

12 Claims. (Cl. 123—90)

This invention relates to poppet valves for internal combustion engines and the like and has as its principal object to provide improved means for positively effecting axial rotation of the valve during engine operation.

A more specific object of the invention is to provide a one-way clutch means operable in response to the lateral component of movement of the valve operating rocker to effect progressive rotation of the valve during valve reciprocation.

A further object of the invention is to provide two such clutches in opposite rotative driving relation with the valve whereby each clutch cooperates with the other in preventing retrograde rotation of the valve.

These and further objects relating to the details in the arrangement and construction of the clutches and the manner of drivably connecting them to the valve rocker are accomplished by our invention, as hereinafter described and claimed, reference being made to the drawings wherein:

Figure 6 is an elevational view taken from line 6—6 of Figure 5.

Figure 7 is a sectional view on line 7—7 of Figure 6.

Figure 8 is a view similar to Figure 5 but showing a still further modification of the invention.

Figure 9 is an elevational view taken from line 9—9 of Figure 8.

Figure 10 is an enlarged diagrammatic view similar to Figure 8 with full and broken lines respectively indicating the different relative positions of the parts during valve operation.

Figure 1:
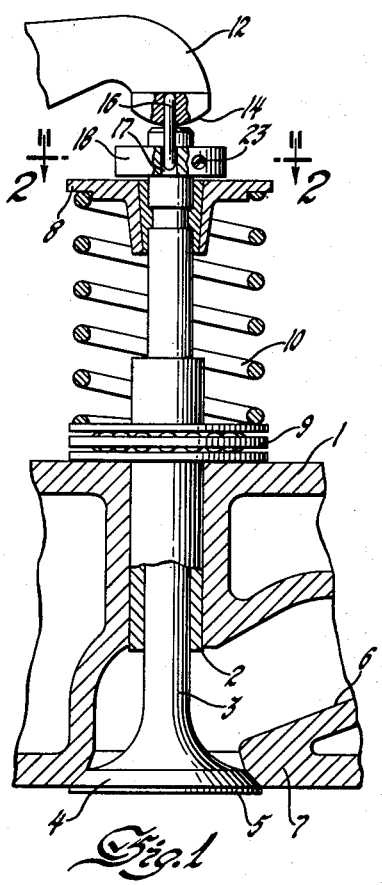
Figure 1 is a view of a portion of an internal combustion engine having a rocker actuated poppet valve incorporating one embodiment of our valve rotating device.
Figure 2:
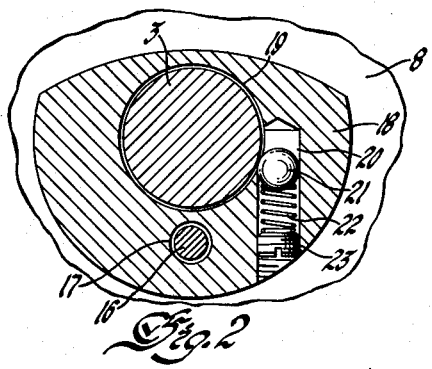
Figure 2 is an enlarged sectional view on line 2—2 of Figure 1.

Referring now particularly to Figures 1 and 2, the numeral 1 designates the frame structure of an internal combustion engine or the like in which is fitted a bushing 2 for slidably guiding the stem 3 of a poppet valve 4. The valve is shown in seated position with its head 5 blocking communication between a passage 6 and the underside 7 of the frame 1. The valve stem 3 extends above the frame 1 and carries a washer 8. Between the washer 8 and an antifriction thrust bearing 9 is a coil compression spring 10 which tends at all times to maintain the valve head 5 in closed position, the bearing 9 accommodating free rotation of the coil spring 10 with the valve relative to the frame 1. 12 represents a valve operating lever in the form of a rocker member having an axis laterally distant from and extending generally perpendicular to the valve stem, in similar manner to the rocker illustrated in Figure 10 wherein the axis of oscillation is provided by the rocker shaft 13. The rocker 12 terminates in a stem driving portion having a convex surface 14 slidably abutting the end of the stem. Depending below the surface 14, along one side of the valve stem is an extension shown in the form of a pin 16 fixedly secured at its upper end in the rocker 12. This pin has its lower end loosely fitting a bore 17 of a clutch body member 18 journaled on the valve stem above the washer 8. This body 18 has a stem journalling bore 19 generally tangential to which is provided a drilled passage 20 extending from the outer periphery of the body and partially restricted at its inner end by the valve stem 3. Slidably movable within the passage 20 is a pawl in the form of a ball 21 which is urged into wedging engagement with the valve stem by a compression spring 22. Serving as an adjustable abutment for the spring 22 is a plug 23 threadedly engaging the passage wall and accessible from the outer end of the passage.

The ball 21 acts to restrain relative rotation in one direction between the valve stem and clutch body 18 while accommodating such rotation in the opposite direction. During oscillation of the rocker 12 about its axis the pin 16 has a lateral component of movement relative to the valve stem and causes an oscillatory rotation of the clutch body 18 about the valve stem axis; and depending upon the height of the rocker axis relative to the lower end of the pin 16, the clutch body rotates either clockwise or counterclockwise during valve opening and returns to its original position during valve closing. During clockwise rotation of this body the ball 21 picks up the valve stem 3 and rotatively drives it also in a clockwise direction. During counterclockwise rotation of the body the spring 22 permits the ball 21 to shift out of wedging engagement with the valve stem and the body freely rotates about the valve stem.

Figure 3:
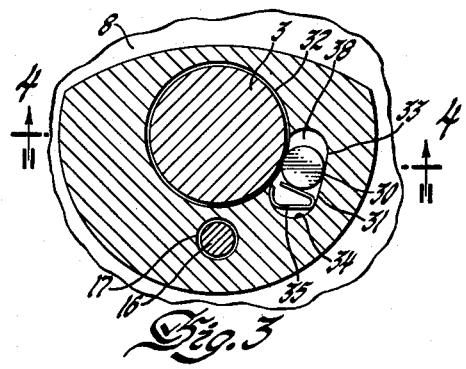
Figure 3 is a view similar to Figure 2 but showing a modified form of pawl.
Figure 4:
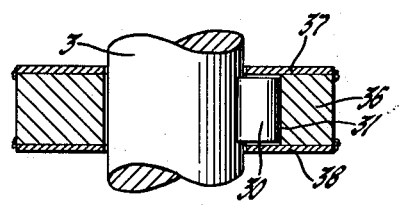
Figure 4 is a sectional view on line 4—4 of Figure 3.

In Figures 3 and 4 are shown an alternative construction of the one-way clutch previously described wherein a pawl in the form of a cylindrical roller 30 operates in an elongated pocket or cavity 31 formed in the bore 32 of the clutch body. This cavity extends generally tangential to the bore 32 and has a gradually varying depth (radially of the bore 32) defined by its bottom wall 33 which forms a raceway for the roller 30. Between the roller 30 and the deeper end 34 of the cavity is a resilient means in the form of a compression spring 35 tending to wedge the roller between the valve stem and the wall 33. Opposite sides of the cavity 31 are closed by plates 37 and 39 respectively which are fixed to the body 36 as by welding or other suitable means. Oscillatory rotation of the assembled clutch body and plates as a unit is effected by the pin 16 in the same manner as described for the clutch of Figures 1 and 2.

Figure 5:
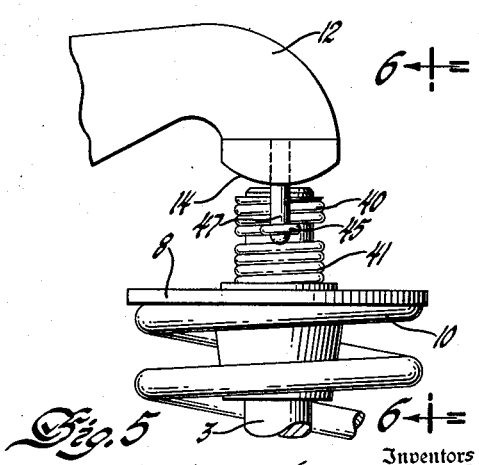
Figure 5 is an elevational view similar to Figure 1 showing a further modification of the invention wherein two helical springs serve as one-way clutches.

Two such one-way clutches arranged in oppositely related driving engagement with the valve stem have the advantage of preventing retrograde rotation of the valve stem during overrunning of the clutches as they take up new rotative positions on the valve stem. One such arrangement of two one-way clutches is shown in Figures 5, 6 and 7 wherein the respective clutches are in the form of helical coil springs 40 and 41. These springs have their convolutions oppositely wound and embraceably gripping the valve stem between the valve spring retaining washer 8 and the rocker surface 14. Oppositely disposed ends of the springs terminate in out-turned loops 44 and 45 respectively which receive corresponding pins 46 and 47 depending from the valve rocker on opposite sides of the valve stem as shown.

During operation, the lateral component of movement of the pins relative to the valve stem imparts rotation of both springs uni-directionally about the valve stem axis. When this movement occurs in a direction away from the rocker axis, the upper spring 40 tightens upon the valve stem and forces the stem to rotate therewith while the lower spring 41 simultaneously releases the valve stem for rotation relative thereto. Conversely, when the lateral movement of the pins is toward the rocker axis, the upper spring 40 slips rotatively about the valve stem which is now being rotatively driven by the lower spring 41 in the same direction as before. Hence, the valve is rotated both during valve closing and valve opening strokes by one or the other of the springs and the friction imposed on the valve stem by the respective clutch springs shifting alternatively to new positions relative to the valve stem is prevented from causing retrograde rotation of the valve stem.

Obviously the spring loops 44 may be located at the opposite ends of their respective springs with the result only that the function of each spring would be reversed during the valve opening and closing strokes respectively.

In Figures 8, 9 and 10 there is shown an alternative arrangement of two helical clutch springs 50 and 51 having their convolutions similarly wound and terminating at corresponding ends in out-turned loops 52 and 53 coaxially receiving a single driving pin 54 depending from the rocker 12. Due to the axial spacing of the loops 52 and 53 from each other they have relative lateral movement with respect to each other during each reciprocatory stroke of the valve stem, which relative movement is utilized in limiting possible retrograde rotation of the valve stem to an amount substantially less than its degree of positive rotation. Since both springs are wound in the same direction about the valve stem they tend to grip and release the stem together, and the upper spring 50 whose loop has the least amount of travel while moving in a clutch gripping direction permits the valve stem to overrun relative to itself while the lower spring 51 whose loop has the greatest travel continues to rotate the stem. And when the two springs are moved in a clutch releasing direction, the upper spring having the least amount of movement operates to limit the possible retrograde rotation of the stem to a corresponding amount.

The aforementioned action of the respective springs is illustrated diagrammatically in Figure 10 wherein A and B represent points on the loops 52 and 53 respectively at the different positions of the rocker shaft and valve stem as shown in solid and broken lines. The distance $m$ represents the amount of retrograde movement of the point A and the distance $n$ represents the travel of the point B, their difference being indicated by the distance $x$. As the valve is opened by the rocker arm, the pin 54 drives both clutch springs in the same direction, the stem rotating the full distance corresponding to the distance $n$ through which the loop 53 is moved and overrunning the clutch spring 50 by an amount corresponding to the distance $x$. On the return or valve closing stroke the valve stem is prevented from returning to its initial position with the movement of the loop 53 through the distance $n$ by the fact that the upper spring 50 will accommodate stem rotation therewith only in amount corresponding to the distance $m$, with the result that during each cycle of operation the spring will have a positive rotation in the same direction by an amount corresponding to the distance $x$.

We claim:

1. In combination with a valve having a stem mounted for axial rotation and reciprocation, valve reciprocating means including a stem engageable lever mounted for oscillation about an axis laterally of and substantially perpendicular to the stem, and a member mounted for oscillation about an axis substantially in the plane of oscillation of the lever and in one-way rotative driving relation with the stem, said lever and member having interengaging rigid portions disposed longitudinally of said lever axis from said member axis whereby oscillation of the lever effects oscillation of the member and intermittent progressive rotation of the stem.

2. In combination with a poppet valve having a stem guided for axial rotation and reciprocation, a valve operating lever mounted for oscillatory rotation about an axis laterally disposed of and in substantially perpendicular relation to the stem, said lever having a stem reciprocating portion and an adjacent clutch driving portion, a clutch reciprocable with and having one-way rotation about the stem, said clutch being drivably engaged with said driving portion at a distance longitudinally of said lever axis from said stem whereby oscillatory movement of the lever about its axis effects an oscillatory rotation of the clutch and an intermittent progressive rotation of the stem.

3. In combination with a poppet valve mounted for axial rotation and reciprocation, valve reciprocating and rotating means including a first member engageable with the valve and supported for oscillation about an axis laterally of and substantially perpendicular to the valve axis, and a second member carried by the valve and in one-way rotative driving relation therewith, one of said members having a portion loosely journaled in the other member at a distance longitudinally of the axis of said first member from the valve axis whereby oscillation of the first member serves to crank the second member in alternate directions about the valve axis and impart intermittent rotation of the valve.

4. In combination with a poppet valve terminating in a stem mounted for axial rotation and reciprocation, a valve operating rocker mounted for oscillation about an axis laterally of and substantially perpendicular to the stem, said rocker having a portion movable longitudinally with and laterally of the stem during said oscillation, a member in one-way coaxial rotary driving relation with the stem, and an arm fixed to said portion and engaging said member, the engagement of said arm with said member being offset longitudinally of the rocker axis from the common axis of rotation of the member and stem.

5. In combination with a poppet valve having a stem guided for axial rotation and reciprocation, a clutch body journaled on the stem and provided with a passage extending generally tangential to the stem from the external periphery of the body, said passage being intersected at its inner end by the stem, a ball slidably supported by the walls defining said passage, a spring behind the ball urging the ball into wedging engagement with the stem, an abutment for the spring in the form of a plug threadedly received in and adjustable longitudinally of the passage, said body having an aperture extending therethrough longitudinally of and offset from the stem, and a valve reciprocating rocker slidably abutting the end of the stem and provided with an integrally associated arm slidably fitting said aperture.

6. In combination with a poppet valve terminating in a stem and a valve reciprocating rocker terminating in a pad slidably abutting the end of the stem, means for positively imparting intermittent progressive rotation to the stem in response to relative lateral movement between the stem and rocker pad during valve reciprocation, said means including a clutch body having a bore rotatively fitting the stem, a recess in said bore of gradually increasing depth, a roller having a diameter less than the maximum depth and substantially exceeding the minimum depth of the recess, said roller being disposed between the stem and the bottom of the recess, a spring carried by the body normally urging the roller toward the shallower end of the recess, and an arm depending integrally from the pad in laterally spaced relation to the stem, said body having an opening slidably receiving the depended end of the arm and accommodating their relative rotation about the longitudinal axis of the arm.

7. In combination with a poppet valve having a stem, guide means for the stem accommodating rotation and reciprocation of the valve, a clutch body journaled on the stem and having an elongated cavity disposed in generally tangential relation to and partially restricted adjacent one of its ends by the stem, a pawl engageable with the stem within said cavity for limiting rotation of the body to one direction about the stem, resilient means within the cavity biasing the pawl into engagement with the stem, said body having a socket in laterally offset relation to the stem, and a valve operating rocker having a stem engaging portion provided with an extension engaging said socket.

8. In combination with a poppet valve having a stem guided for axial rotation and reciprocation, a valve operating rocker including a stem engaging portion having lateral movement in alternately opposite directions relative to the stem during valve reciprocation, a plurality of coil springs embracing the stem and accommodating its rotation in one direction only, one end of each spring being loosely anchored to said rocker portion whereby the springs are oscillated rotatively about the axis of the stem and the stem is progressively rotated simultaneously with the reciprocation of the valve.

9. In combination with a poppet valve stem guided for axial rotation and reciprocation, a stem reciprocating lever fulcrumed for oscillation about an axis laterally of and in generally perpendicular relation to the stem, said lever having a stem engaging portion movable laterally of the stem during stem reciprocation, a pair of pins integrally associated with said portion and depending therefrom on opposite sides of the stem, and a pair of oppositely wound axially adjacent helical springs embraceably gripping the stem and having oppositely related ends secured to the respective pins whereby lateral movement of said portion during each reciprocatory stroke of the stem causes progressive rotation of the stem.

10. In combination with a poppet valve stem guided for axial rotation and reciprocation, a stem reciprocating lever fulcrumed for oscillation about an axis laterally of and in generally perpendicular relation to the stem, said lever having a stem engaging portion movable laterally of the stem in alternately opposite directions during stem reciprocation, a pin unitary with said portion and depending therefrom along one side of the stem, and a pair of correspondingly wound, axially adjacent helical springs embraceably gripping the stem and accommodating relative rotation of the stem in one direction only, said springs terminating at corresponding ends in outwardly extending loops embracing longitudinally spaced-apart portions of the pin.

11. In combination with a poppet valve stem guided for axial rotation and reciprocation, a valve operating rocker having a stem driving portion, a pair of helical springs embraceably gripping longitudinally adjacent sections of the stem below said portion, said springs having their convolutions similarly wound to accommodate rotation of the stem in the same direction relative to each and restrain rotation of the stem in the opposite direction, and a rocker extension depending eccentrically of the stem from said portion and secured to the uppermost end of each said spring.

12. In an internal combustion engine or the like, an engine frame, a poppet valve mounted for reciprocation and rotation in said frame, a valve return spring coaxial with the valve, a washer carried by the valve and abutting one end of the return spring, an antifriction thrust bearing between the opposite end of the return spring and the engine frame accommodating free rotation of the return spring with the valve relative to the frame, a lever for moving the valve axially in opposition to the return spring and having a valve engaging portion having movement laterally of the valve during valve reciprocation, a pair of helical clutch springs coaxial with and embraceably gripping the valve, said clutch springs being of opposite helix and having oppositely terminating end portions secured to said lever portion.

ANDREW W. ZMUDA.
THOMAS H. MITZELFELD.

References Cited in the file of this patent

UNITED STATES PATENTS

| Number | Name | Date |
|---|---|---|
| 846,077 | Wishon | Mar. 5, 1907 |
| 1,032,584 | Bostrom | July 16, 1912 |
| 1,534,476 | Wirrer | Apr. 21, 1925 |
| 1,596,484 | Garlick | Aug. 17, 1926 |
| 2,589,418 | Mitzelfeld et al. | Mar. 18, 1952 |

FOREIGN PATENTS

| Number | Country | Date |
|---|---|---|
| 16,598 | Great Britain | Nov. 24, 1915 |